United States Patent
Linblad

[15] 3,684,167
[45] Aug. 15, 1972

[54] INTERNAL TEMPERATURE RESPONSIVE MEAT PROCESSING APPARATUS

[72] Inventor: Thomas N. Linblad, Cincinnati, Ohio

[73] Assignee: Fulton Industries, Inc., Cincinnati, Ohio

[22] Filed: Aug. 20, 1970

[21] Appl. No.: 65,437

[52] U.S. Cl. .................................................. 236/1
[51] Int. Cl. ........................................... G05d 23/22
[58] Field of Search .............. 236/1, 15 A, 15 B, 15 C

[56] References Cited

UNITED STATES PATENTS

| | | | |
|---|---|---|---|
| 1,296,250 | 4/1919 | Wyss | 236/15 B |
| 1,511,050 | 10/1924 | Collins | 236/15 B X |
| 2,158,628 | 4/1939 | Kuhlman | 236/1 B |
| 2,820,130 | 1/1958 | Dadson | 236/15 A |

Primary Examiner—Edward J. Michael
Attorney—Wood, Herron & Evans

[57] ABSTRACT

An apparatus for processing meat is provided with a plurality of internal temperature sensing probes for insertion into meat products at different points spaced about a meat processing chamber. A control system operates to terminate a step in the meat processing operation when the internal temperatures of a certain number of the meat products reach a preset threshold temperature. The probes are sequentially scanned and their readings compared with the threshold temperature and the results of the comparison are stored for use by the control system.

9 Claims, 3 Drawing Figures

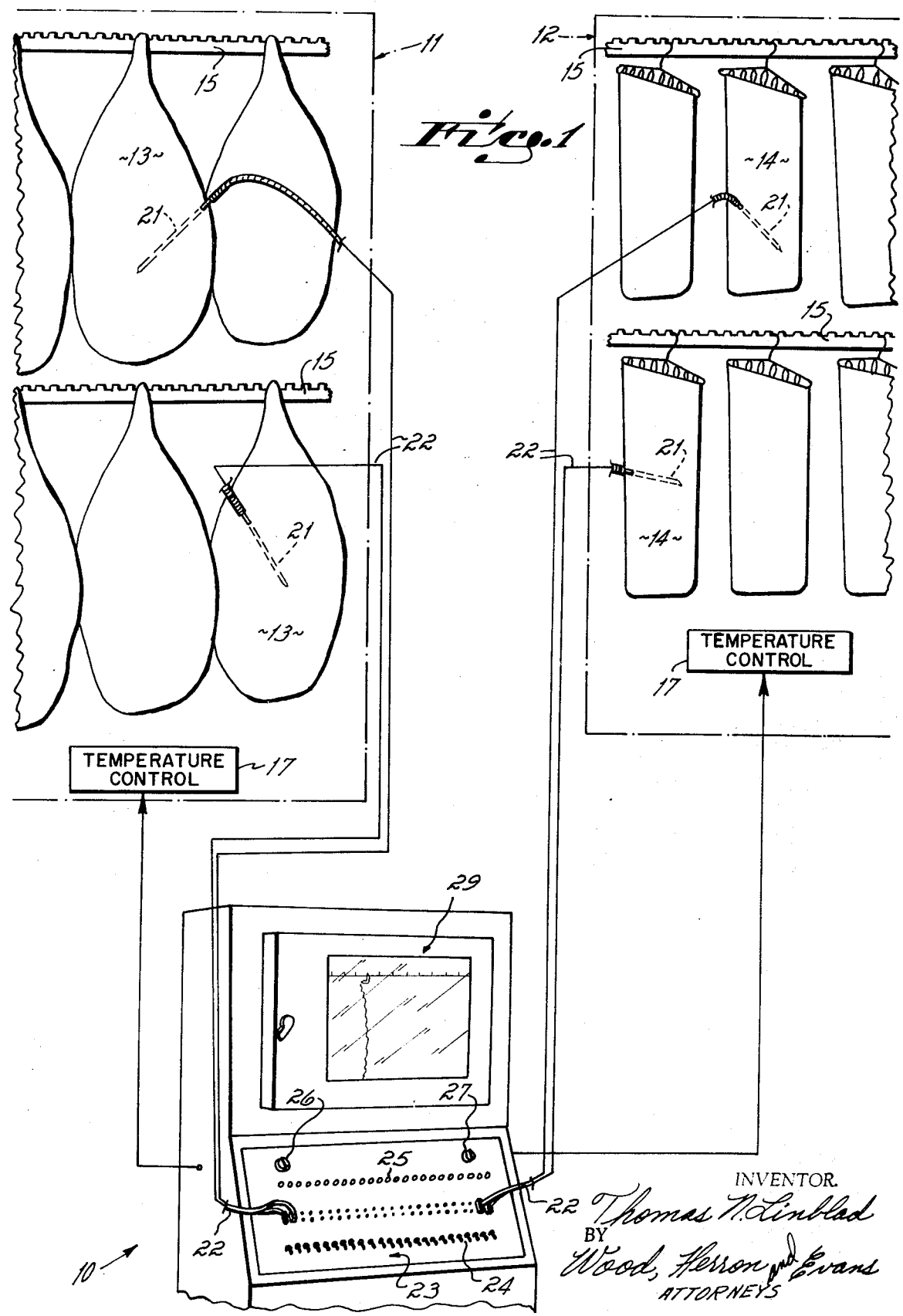

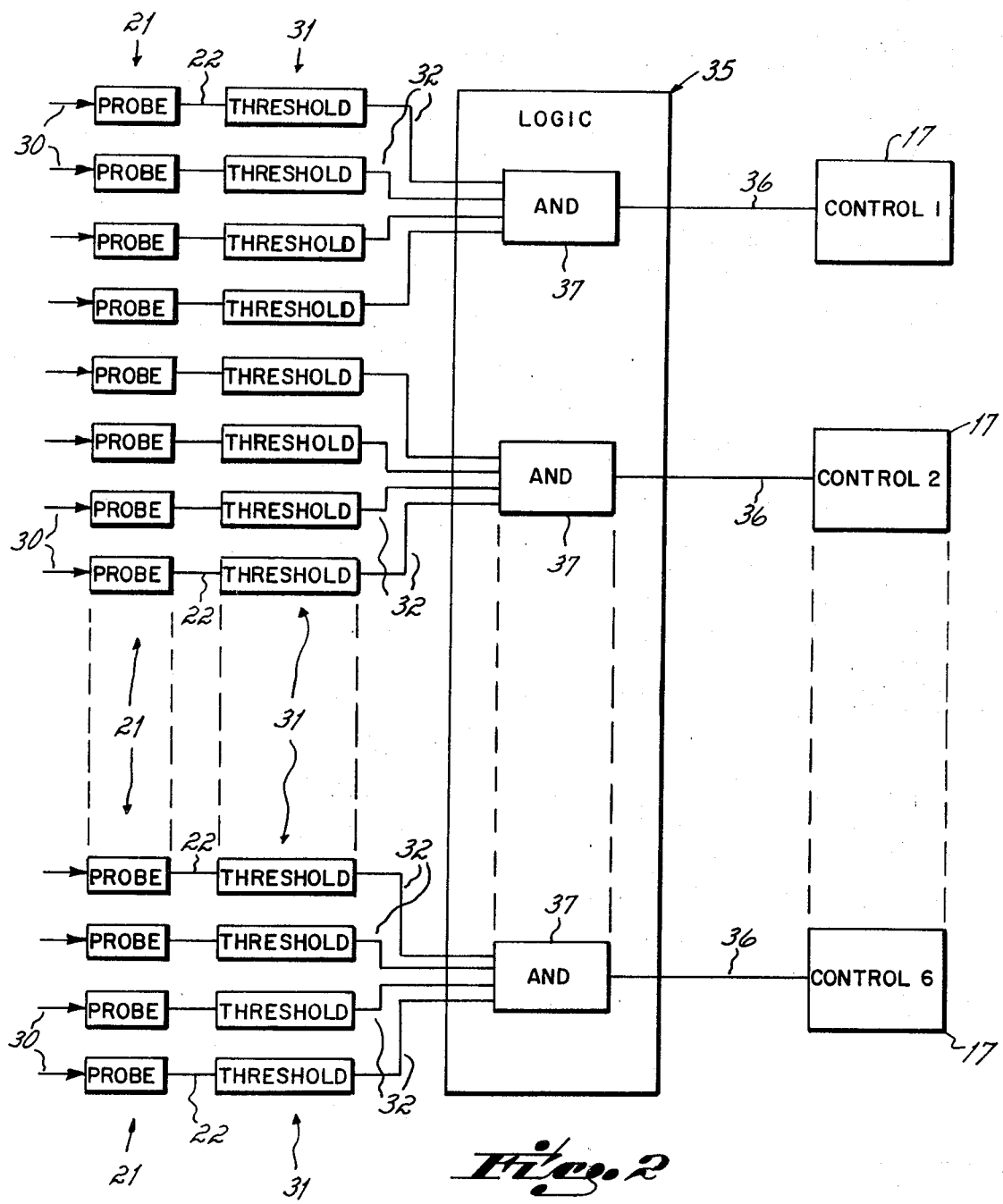

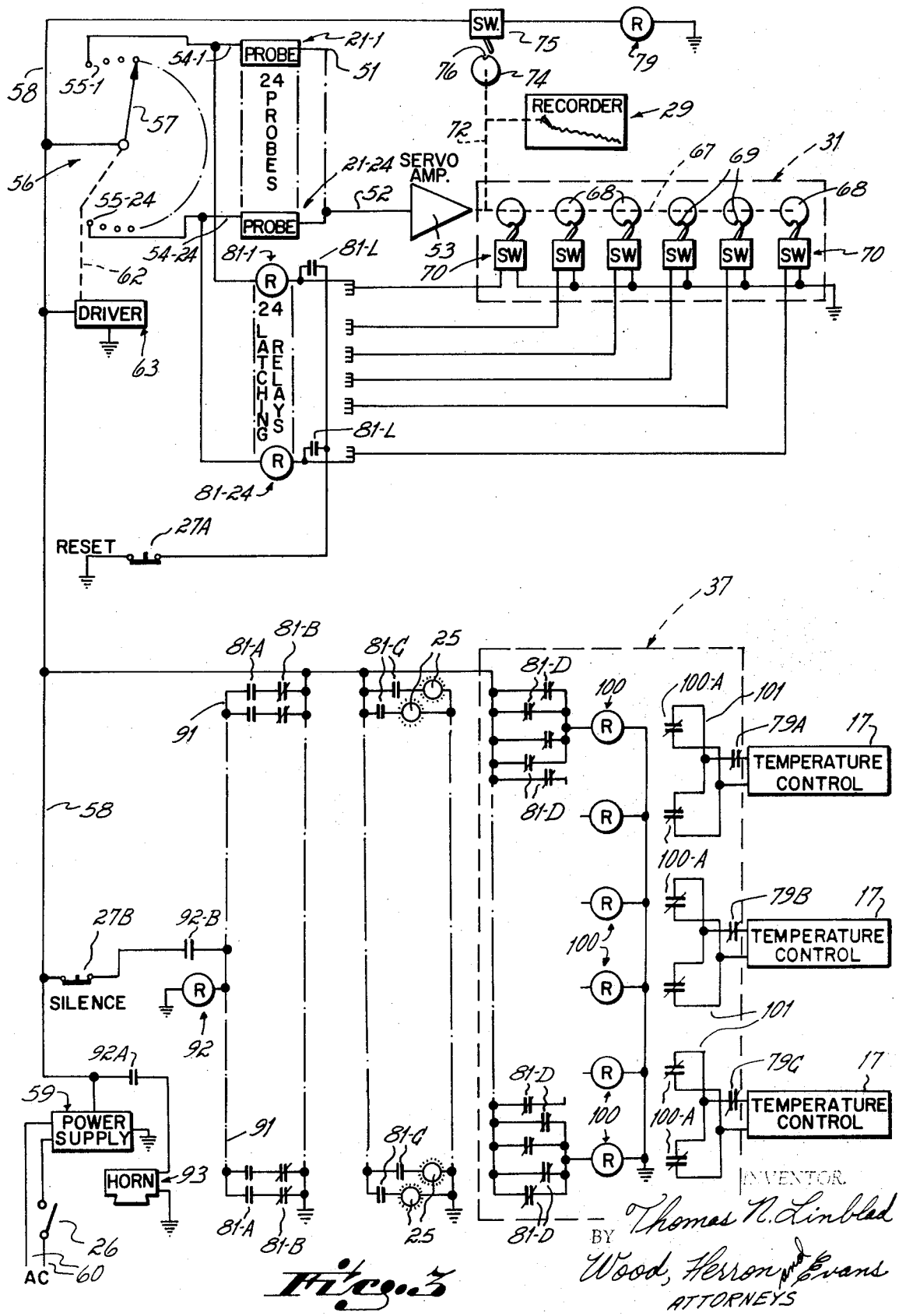

INTERNAL TEMPERATURE RESPONSIVE MEAT PROCESSING APPARATUS

The present invention relates to the processing of meat and, more particularly, is directed to an apparatus for controlling the processing of meat in accordance with the internal meat temperature in smokehouses, cookers, freezers or chilling rooms.

In the processing of meat, particularly in the processing of pork products such as ham, bacon and sausage loaf, it is necessary that the meat be brought to some elevated temperature and at least partially cooked.

In the preparation of ham, for example, it is essential that the meat be brought to a minimum temperature throughout of 137°F., which is the killing temperature of trichinosis, so that the ham may be cured. Typically, the smokehouse or cooking process which is intended to carry out this process will aim for a minimum internal temperature of something in excess of 137°F., say 142°F., to insure that the killing temperature of 137°F. is met throughout the entire meat product. The 142° temperature is referred to as the finish temperature, and need only be met momentarily and does not have to be sustained for any period of time in order to effectively cure the meat. Exceeding this finish temperature results in a loss of protein from the meat and a general deterioration of the meat product. Specifically, the loss of protein is such that the product will shrink in weight by approximately one-half percent for each degree Farenheight above the finished temperature. This shrinkage represents a loss in the gross saleable ham product of the meat processor. Furthermore, excessive protein loss results in a ham which fails to meet U.S.D.A. requirements for protein count, and when this occurs, the product cannot be sold as ham, but must be converted to and sold as an inferior product such as sandwich loaf. If the internal temperature of the meat is not carefully regulated, a great loss in product, and consequently a substantial loss in profit to the meat processor, will result.

It is not only important that the internal temperature of a particular product be known and controllable, but it is additionally important that the internal temperature of each of the products which is being processed at once in a given smokehouse be controlled uniformly. The greater the spread in temperatures among the different products within a smokehouse, the greater will be the waste that will occur, for it will be necessary to overcook certain of the products in order to assure that the minimum critical temperature will be met by all of the products within the house. A typical smoking cycle in a large smokehouse will process simultaneously from 15,000 to 20,000 pounds of ham. In such a cycle, a 6°F. spread in internal temperature among the products represents an average of a 3° excess in final temperature to achieve finished temperature for all of the meat. This will, on the average, result in a loss to the processor of approximately 250 lbs. of finished product.

Care must also be taken in bringing of the ham up to its internal finished temperature. For example, ham will be put into the smokehouse at a chilled temperature of from 45° to 60°F., the house being initially at a room temperature of approximately 75°. In a typical smokehouse cycle of from 8 to 15 hours, the temperature of the house is gradually increased, usually by a cam-controlled timer which proceeds through a programmed temperature cycle. During the cycle the temperature may increase say to approximately 135°F. for the first 2 hours, and then to 160°F. for the next 2 hours, and then to approximately 180° for the remainder of the smoking cycle. If the temperature in the smokehouse is increased too rapidly, the outside of the meat will shrink and protein will be squeezed out of the interior of the meat. While the temperature must be applied gradually, an excessively long smoking time will be required and some loss of product and an increased cost in the overall smoking cycle operation will result.

During the portion of the process prior to the reaching of the finished temperature, the monitoring of the internal temperature of the different meat products throughout the smokehouse will show a variation in the temperature distribution throughout the house. This represents an improper "balancing" of the house and is usually the result of non-uniform heating or wide variation in the size and grade of the products within the house. In such cases, the hams will not arrive at a finished temperature simultaneously.

In certain cases, precise internal temperature control is important for other reasons. Ham, for example, is frequently injected with a fluid which carries certain salts and spices. This fluid is referred to as "pump" and the ham is "pumped" to approximately 120 percent of its original weight or "green weight." In processing, the added moisture or "pump" is removed through the smoking process until the ham is reduced to just less than 102 percent of its green weight. If the finished product ham is of greater weight than this 102 percent, U.S.D.A. regulations require that it be marked "water added" and a product so marked will command a different market price. By careful internal temperature control, the ham can reach 102 percent of green weight at the same time the finished temperature is reached. When control is not adequately maintained, either excessive water will remain in the ham, or excessive protein will be lost from the ham.

Temperature control is also important in the operation of chill rooms, for example, in the preparation of bacon. Typically, bacon will finish at a temperature of approximately 126° to 128°F. when it is removed from the smokehouse. The bacon is then conveyed to a chill room where the internal temperature is reduced to approximately 24° to 28°F. This temperature is important for three reasons: First, the bacon is still uncooked and therefore it must be preserved by refrigeration; second, the bacon must be cooled to at least 28°F. in order that automatic slicing can easily be performed; and third, the temperature must not be reduced too low, for if this is done, dehydration of the bacon will result. The loss of weight through dehydration of any mat at this stage represents a gross loss in the final product which is sold by the pound.

Prior art systems have not been completed satisfactory in controlling and optimizing the temperatures during the various meat processing cycles, for none of them have sought to control meat processing based upon the response to internal meat temperature in different areas within a processing room such as a smokehouse. Direct feedback control systems have not been employed to optimize meat processing operations.

Accordingly, it is a principal object of the present invention to provide an automatic temperature control system for meat processing operations which will optimize the meat processing time and provide better control over the resulting product and to overcome the disadvantages of the prior art. More particularly, it has been an object of the present invention to provide a meat processing control system which is responsive to the internal temperatures of the meat products spaced about a meat processing chamber, and which will execute control functions based upon a plurality of meat products having attained certain predetermined threshold temperatures.

The present invention is predicated upon the concept of controlling a meat processing operation by sensing the internal temperatures of meat products at different points spaced about a meat processing chamber. More particularly, a plurality of temperature sensing probes are inserted into different meat products spaced about a meat processing chamber such as a smokehouse. These probes generate temperature signals which are compared with preset threshold values to generate threshold signals when the temperature thresholds are exceeded. The threshold signals are combined logically to generate a control signal which is employed to control some aspect of the meat processing operation such as to terminate the smoking process or to initiate a subsequent step in the processing cycle. More particularly, one preferred form of the present invention employs means for sequentially sampling the plurality of probes, and sequentially comparing the temperatures of each of the sampled probes with a predetermined threshold value, storing the results of the comparison, and logically comparing a plurality of the stored values to generate a control signal.

The principal advantages of the present invention lie in provision for carefully monitoring and controlling the processing of the meat toward the optimizing of the meat processing operation and the improvement of the product so produced. A further advantage lies in a more economical performance of the processing operation through a reduction in processing time, the amount of supervision required, and the amount of product wasted through overprocessing. Furthermore, the present invention provides the insurance and reliability of automatic control.

The present invention further provides the advantages of enabling the processor to better balance his processing operation, and to maintain area control of his processing chamber. For example, the processor can terminate the processing of certain products which have more rapidly arrived at the finish temperature, while allowing the processing of others to continue. Thus the over-processing of some of the products is prevented and thus the shrinkage or other loss of products which could result from over processing is reduced or eliminated. From the information gained, the processor can take steps to balance his process in subsequent operations.

The present invention is highly effective to prevent protein loss during the smoking of hams and the cooking of sausage loaf, and to prevent loss by dehydration in chill rooms of products, such as bacon and most other pork products. For example, it has been found that in the processing of hams, where a shrinkage of an average of 8.4 percent has been previously encountered, with the employment of the present invention the shrinkage was reduced to an average of 6.88 percent, for a net reduction in the overall average shrinkage of 1.52 percent of the final product. Similarly, for bacon, where prior to the use of the present invention the shrinkage was on the average 7.44 percent, by the use of the present invention this average shrinkage was reduced to 6.89 percent or a net reduction of 0.55 percent in the shrinkage of the final product. In the highly competitive meat processing industry, these percentages represent a major increase in the profit realized on the meat products.

Other objects and advantages of the present invention will be more readily apparent from the following detailed description of the drawings illustrating one preferred form of the meat processing system of the present invention wherein:

FIG. 1 is a diagrammatic perspective of the system of the present invention;

FIG. 2 is a logic diagram of the system of FIG. 1; and

FIG. 3 is a partial diagrammatic and partial electrical schematic diagram illustrating one preferred form of the system of FIG. 2.

Referring first to FIG. 1, a single control module 10 is illustrated for controlling two meat processing chambers 11 and 12. The chamber 11 represents a smokehouse in which meat such as ham is cured at an elevated temperature while the chamber 12 represents a chill room where products such as hams and bacon, having been previously heated, are chilled. The chambers 11 and 12 contain a plurality of racks or "trees" 15 for supporting a plurality of hams 13 or slabs of bacon 14 in a spaced relationship about the chambers 11 and 12. Each of the rooms 11 and 12 has a temperature control unit 17 contained therein for controlling the temperature within the chambers 11 and 12.

In each of the chambers 11 and 12 are provided a plurality of temperature sensing probes 21. Each of the probes 21 has a thermocouple junction encased in and mounted at the tip of a stainless steel rod which is inserted into one of the meat products. The probes are inserted into meat products located in different areas about the chambers.

Each of the probes 21 is connected through a lead 22 to a patch panel 23 on the face of the module 10. The patch panel 23 includes a plurality of two terminal connectors each for receiving a jack at the end of a different one of the probe lines 22 connecting the probe lines 22 to the module 10. Each of the connectors has associated with it a toggle switch 24 which is so connected to selectively short the leads of the associated probe through a dummy junction, thereby allowing the operator to easily select the probes which will govern the control operation. Also associated with each of the connectors 23 is an indicator light 25 which displays the status of the temperature sensed by the associated probe as will be more fully explained below. A horn, not shown, is provided and sounds each time one of the indicator lights is turned on. The module 10 also includes a power switch 26 and a three-position reset-silence switch 27. The switch 27 has a normal position, a "reset" position for turning off the indicator lights 25 and a "silence" position for silencing the horn. Preferably, the module 10 includes auxiliary equipment such as a recorder strip chart 29 to provide a permanent record of the temperatures sensed by the probes on a time basis.

The logic diagram of FIG. 2 represents a system according to the present invention. The probes 21 sense the internal temperatures of the meat in the form of thermal signals 30. The probes 21 generate electrical signals proportional to these internal meat temperatures at the junction of the thermocouple of the probe. These electrical temperature signals are communicated along each of the lines 22 to a threshold detector 31 contained within the module 10. The threshold detector 31 compares the temperature signals with a preset temperature value which might represent, for example, the finish temperature desired for the product being processed. If the temperature signal exceeds this predetermined value, a threshold signal is generated on the outputs 32 of the detectors 31. The outputs of the detectors are connected to and are the inputs for this logic circuit 35. This logic circuit 35 generates control signals at its outputs 36. Each of the control signals is generated in response to a plurality of threshold signals, and in every case, represents a plurality of probes arriving at the predetermined threshold temperature for that probe. The control circuitry may consist of logical AND gates 37 which generate signals only when all of the associated probes have reached the predetermined temperature.

The outputs 36 connect to the temperature control units 17 within the processing chamber, or they can be connected through additional logic circuitry.

Referring to FIG. 3, one preferred form of the present invention is illustrated in partial electrical schematic and partial diagrammatic form. The embodiment of FIG. 3 illustrates a circuit for sequentially scanning the outputs of the 24 different probes, thereby eliminating the need for separate parallel circuits for each of the probes according to the concept set forth in FIG. 2. The circuit of FIG. 3 also provides a system which is very readily adaptable for use with a strip chart recorder.

Referring to FIG. 3, the 24 probes 21-1 through 21-24 each have a common lead 51 connected to the input 52 of a servo amplifier-motor 53. Each of the probes 21 has a second lead 54-1 through 54-24 connected to a different one of a set of 24 contacts 55-1 through 55-24 of a rotary selector switch 56. A wiper contact 57 of the selector switch 56 is connected to an output power lead 58 of a power supply 59. The power supply 59 has a pair of input leads 60 connected to a 115 volt a.c. line through the power switch 26. The wiper arm 57 of the selector switch 56 is mechanically connected through a linkage 62 to a synchronous driver motor 63 which is electrically connected between the power lead 58 and ground. The driver motor 63 rotates the linkage 62 to further rotate the wiper contact 57 of the selector switch 56 to sequentially energize each of the contacts 55-1 through 55-24 in recurring cycles and to thereby sequentially connect each of the probes 21-1 through 21-4, one at a time, to the input 52 of the amplifier 53.

The servo amplifier-motor 53 drives an output shaft 67 on which six independently settable cams 68 are mounted. The shaft 67 assumes an angular position in accordance with the input of the servo amplifier, which corresponds to the temperature sensed by the one probe 21 which is connected through the selector switch 56. The cams 68 are settable to position a notch 69 to trip a microswitch 70 either to an ON or an OFF position, depending on the position of the shaft 67. The cams can be set to trip the switch to the ON position at any predetermined temperature of the probe 21. The cams 68 and the switches 70 correspond to the threshold detectors 31 of FIG. 2.

The shaft 67 is also mechanically linked through a linkage 72 to a recorder 29 and to an auxially cam 74. The cam 74 is also settable on its shaft to position the notch 76 to trip a microswitch 75 at some predetermined temperature, and is primarily provided to trigger an overall safety limit switch which will shut down the system when some excessive temperature has been sensed by any one of the probes 21. The switch 75 is connected in series with the winding of a relay 79 between the power line 58 and ground. When temperature as preset by the cam 74 is exceeded, the switch 75 will close to energize the relay 79.

Each of the contacts 55-1 through 55-24 of the selector switch 56 are connected to a winding of a different one of the relays of a set of 24 latching relays 81-1 through 81-24. The windings of the relays 81 are connected in series between the respective contacts 55-1 through 55-24 of the selector switch 56 and to one of the microswitches 70. The 24 latching relays 81 are connected in groups of four to different ones of the six microswitches 70, so that different predetermined threshold temperatures can be set for the different groups of probes.

When the selector switch is set in any one position, one of the probes 21 is connected to the servo amplifier 53 to position the shaft 67 in an angular position corresponding to the temperature sensed by the selected probe. If this temperature exceeds the temperature set by any of the cams 68, the microswitches 70 associated with the respective cams 68 will be tripped to the ON position. Since the energized contact 55 is also connected to the winding of the one of the latching relays 81 which corresponds to the probe 21 being sensed, only this one of the relays 81 can be energized. If the microswitch to which that winding is also connected is closed by the associated cam 68, then this relay will be energized to register that the predetermined temperature has been exceeded on the associated probe 21.

Each of the relays 81 is provided with a set of contacts 81-L which are connected in parallel with the switches 70 to ground. These contacts are closed by the respective relays 81 causing the relays 81 to latch in the energized condition. Once latched, these relays will remain ON until the normally closed reset contacts 27A of the reset-silence switch 27 are opened to break the holding circuit through relay contacts 81-A. The latching of the relays 81 stores the information concerning the status of the associated probe 21.

Each of the relays 81 is also provided with two pair of contacts 81-A, 81-B which are normally open and normally closed respectively. These contacts 81-A, 81-B are make-before-break contacts connected in series between the voltage source lead 58 and a lead 91. Connected in this manner, a brief momentary closing of the circuit through the contacts 81-A and 81-B results when the relays 81 are energized. Thus a pulse is generated on the line 91. The lead 91 is connected to the winding of a relay 92 having its contacts 92-A connected between the power lead 58 and the input of an alarm horn 93. The relay 92 is triggered by each of the momentary pulses through the contacts 81-A and 81-B. The relay 92 is also provided with a contact 92-B which is connected through the normally closed contacts 27B of the reset-silence switch 27. The energizing of the relay 92 closes the contacts 92-B thereby communicating a holding voltage to the line 91 to latch the relay 92, closing the contact 92-A causing the horn 93 to sound. The horn is silenced by the opening of the contacts 27-B of the reset-silence switch 27 which breaks the holding voltage on the relay 92 causing it to drop out.

The relays 81 are also provided with sets of contacts 81-C, each of which is connected in series with one of the indicator lights 25 on the panel 23 of the module 10, between the power line 58 and ground. When so connected, the indicator lights 25 are energized if the temperature threshold was exceeded for that probe on the last scan of the selector switch 56.

Still another set of normally closed contacts 81-D of the relays 81 are connected in series between the power line 58 and through the winding of the relay 100 to ground. The contacts 81-D are connected in parallel in groups of four to different ones of the relays 100. These groups do not necessarily have to correspond to the groups of relays connected to the different switches 70. Because these contacts 81-D are normally closed, the relays 100 will be normally energized. As the probes corresponding to the contacts of any one of the relays 100 reaches the predetermined temperature, the relays 81 will latch and its contacts 81-D will open. When all of the contacts connected to any one of the relays 100 are opened, the circuit to the winding of the relay 100 is broken and the relay 100 will deenergize. The contacts 100-A of the relays 100 are connected in series with the leads 101 of the control circuit of one of the control units 17. In the embodiment illustrated in FIG. 3, the contacts 100-A of the relays 100 are connected in parallel across the leads of the control unit 17. Connected in this manner, only when all eight of the probes which correspond to the two relays 100 have reached a predetermined temperature, will the control circuit of the control unit 17 be broken and the unit 17 be de-energized.

The control leads 101 of the units 17 are also each connected in series with one of the normally closed contacts 79-A, 79-B and 79-C, of the safety temperature relay 79. Thus, when the relay 79 is energized in response to the maximum permitted temperature being exceeded, all of the units 17 will be shut down. The contacts 81-D of the relays 81, and the relays 100 and their contacts 100-A correspond to the logic circuitry 37 of FIG. 2.

In operation, the driver motor 63 continuously rotates the selector switch 56 to sequentially connect the contacts 55-1 through 55-24 to the probe source 58. The closing of the contacts 55 sequentially connects each of the probes 21-1 through 21-24 to the input of the servo amplifier 53. Similarly, the relays 81-1 through 81-24 are sequentially connected into the circuits of the microswitches 70. The servo amplifier 53 turns the shaft 67 in accordance with the temperatures sensed by each of the probes 21 as the probes are sequentially scanned. When this temperature exceeds the threshold temperature which has been preset by the positioning on the shafts 67 of the cam 68 to which the selected relay 81 is connected, the switch 70 will close to energize the relay 81 which corresponds to the selector probe 21.

This relay 81 latches to record the fact that the corresponding probe has reached its threshold temperature. The relay 81 will remain latched until it is reset by a closing of the contacts 27A of reset switch 27. Similarly, the closing of each of the relays 81, through contacts 81-A, 81-B triggers the horn 93 which will continue to sound until silenced by closing of the contacts 27-B of reset switch 27.

The closing of each of the relays 81 further causes an opening of the relay contact 81-D. When all of the contacts 81-D which are connected to a given relay winding 100 have been broken, the relay 100 will be de-energized opening the contacts 100-A. The de-energizing of both of the relays 100 which are connected across the leads 101 of a control unit 17 causes the control circuit of that temperature unit 17 to be broken thereby shutting down that temperature unit.

If any of the probes 21 exceeds some excessive temperature limit as set by the cam 74, the switch 75 will be closed to energize the relay 79 switch and its contacts 79-A, 79-B and 79-C to break all of the control circuits 101 of the temperature control units 17.

What is claimed is:

1. In a meat processing system having a meat processing chamber, means within the chamber for receiving meat products at an initial temperature and for supporting said meat products in spaced relationship about the chamber for processing, and means for effecting the temperature within the chamber for the processing of the meat products, the improvement comprising:

a plurality of temperature sensing probes spaced about the chamber for measuring the internal temperatures of different meat products within the chamber, and for generating temperature signals in accordance with the internal temperature of the meat products;

means for generating a threshold signal in response to each of said temperature signals reaching a predetermined value;

means for generating a control signal in response to a predetermined plurality of said threshold signals; and control means for altering the meat processing condition within the chamber in response to said control signal.

2. An improvement according to claim 1 wherein: said control means is operative to turn off said temperature effective means in response to said control signal.

3. An improvement according to claim 1 further comprising:
an alarm responsive to said control signal.

4. An improvement according to claim 1 further comprising:
a plurality of indicator means, one responsive to each of said threshold signals.

5. An improvement according to claim 1 wherein:
said predetermined plurality of threshold signals is all of said threshold signals.

6. An improvement according to claim 1 further comprising:
  means for generating an excessive temperature signal in response to any one of said temperature signals reaching a predetermined excessive value; and
  said control means being operative to turn off said temperature effecting means in response to said excessive temperature signal.

7. An improvement according to claim 1 wherein said threshold signal generating means includes:
  a threshold detector for generating said threshold signals in response to signals applied its input;
  means for sequentially connecting each of said temperature signals to the input of said detector;
  a memory unit having an input connected to the output of said detector for storing said threshold signals.

8. An improvement according to claim 7 wherein:
  said control signal generating means includes at least one AND gate having inputs connected to a plurality of said memory unit.

9. An improvement according to claim 1 further comprising:
  a memory unit connected to said threshold signal generating means for storing said threshold signals; and
  said control means including logic circuitry operative to generate said control signal in response to the information stored in said memory unit.

* * * * *